(12) United States Patent
Frahm et al.

(10) Patent No.: US 7,506,879 B1
(45) Date of Patent: Mar. 24, 2009

(54) TRANSPORT CART SYSTEM INCORPORATING A PORTABLE FLOOR SURFACE FOR UNLOADING PALLETED CONTAINERS FROM A VEHICLE AND METHOD OF USE

(75) Inventors: Jeffry R. Frahm, Frankenmuth, MI (US); Matthew A. Royalty, Midland, MI (US); Barry E. Monroe, Pinconning, MI (US)

(73) Assignee: Magline, Inc., Pinconning, MI (US)

( * ) Notice: Subject to any disclaimer, the term of this patent is extended or adjusted under 35 U.S.C. 154(b) by 272 days.

(21) Appl. No.: 11/295,795

(22) Filed: Dec. 7, 2005

Related U.S. Application Data

(60) Provisional application No. 60/633,929, filed on Dec. 7, 2004.

(51) Int. Cl.
*B62B 11/00* (2006.01)

(52) U.S. Cl. .................. 280/63; 280/79.11; 193/41; 14/2.4

(58) Field of Classification Search .......... 280/63, 280/79.11, 79.4; 193/41; D34/32; 410/66; 14/2.4

See application file for complete search history.

(56) References Cited

U.S. PATENT DOCUMENTS

| | | | | |
|---|---|---|---|---|
| 5,433,576 A | * | 7/1995 | Drew | 414/401 |
| 5,467,977 A | * | 11/1995 | Beck | 473/497 |
| 5,582,114 A | * | 12/1996 | Feiner | 108/50.11 |
| 6,520,515 B2 | * | 2/2003 | Krawczyk | 280/79.2 |

* cited by examiner

*Primary Examiner*—Christopher P Ellis
*Assistant Examiner*—Katy Meyer
(74) *Attorney, Agent, or Firm*—Reising, Ethington, Barnes, Kisselle, P.C.

(57) ABSTRACT

A portable floor surface and method of use thereof facilitates unloading side-by-side cargo carts disposed in laterally spaced relation with an aisle defined between them. The floor surface has a body with opposite front and rear ends and lower and upper surfaces extending between the front and rear ends. The upper surface is brought into a generally flush relation with the floor of the cargo cart when the lower surface is resting on a common floor surface with the cargo cart. A ramp surface extends at an upward inclination from the front end toward the rear end and a latch member operably associated with the body is adapted for operable engagement with a first cargo cart to releasably lock the portable floor surface to the first cargo cart.

14 Claims, 5 Drawing Sheets

5A

TRANSPORT CART SYSTEM INCORPORATING A PORTABLE FLOOR SURFACE FOR UNLOADING PALLETED CONTAINERS FROM A VEHICLE AND METHOD OF USE

REFERENCE TO CO-PENDING APPLICATION

This application claims the benefit of, and incorporates in by reference in its entirety, U.S. Provisional Application Ser. No. 60/633,929, filed Dec. 7, 2004.

BACKGROUND OF THE INVENTION

1. Field of the Invention

This invention relates generally to cargo cart systems for carrying an array of vertically stacked containers to be transported in a delivery vehicle, and more particularly to a false floor for such systems to facilitate unloading the cargo carts.

2. Related Art

A system which is presently commonly used to handle and transport cases of beverage containers, for example, from a manufacturing and/or distributing center to a retailer, such as a grocery store, convenience store, etc., is inherently a laborious, time-consuming operation requiring numerous delivery vehicles and operators, each covering a rather limited region. The traditional system involves stacking large numbers of containers onto large pallets at a distribution center, which are loaded into the bay wells of specially designed delivery trucks.

Upon arrival at a delivery site, the operator fills the particular order by individually selecting the particular containers from the various bays. The operator unloads the containers by hand and places them onto a hand truck or wheeled dolly typically resting on a lower level than the containers for transport into the facility of the recipient. It takes considerable time and physical effort to fill an order in this manner, inasmuch as it requires the operator to select the appropriate brand and quantity of containers called for by the order, and then to physically remove the various containers from the bays, restack them onto the hand truck or dolly, and transport the containers from the delivery truck into the retail facility.

SUMMARY OF THE INVENTION

A portable floor surface for use to facilitate unloading side-by-side cargo carts disposed in laterally spaced relation to leave an aisle between them and having a floor raised on casters. The portable floor surface has a body with opposite front and rear ends and lower and upper surfaces extending between the front and rear ends. The lower surface and upper surface are spaced a predetermined distance from one another to bring the upper surface into a generally flush relation with the floor of the cargo cart when the lower surface is resting on a common floor surface with the cargo cart. A ramp surface constructed as one piece with said body extends at an upward inclination from the front end toward the rear end of the body. A latch member is operably associated with the body and adapted for operable engagement with a first cargo cart to releasably lock the portable floor surface to the first cargo cart.

Another aspect of the invention includes a portable floor surface in combination with cargo carts transportable in an interior of a vehicle. The cargo carts have a load supporting floor raised on casters above a floor surface of the vehicle for supporting palleted containers. The cargo carts are disposed in side-by-side releasably locked position adjacent one another to form opposed rows of the cargo carts laterally spaced to define an aisle between the opposite rows. The portable floor surface includes a body having opposite front and rear ends with lower and upper surfaces extending between the front and rear ends. The lower surface and upper surface are spaced a predetermined distance from one another to bring the upper surface into a generally flush relation with the floor of the cargo cart when the lower surface is resting on the floor surface of the vehicle. A ramp surface constructed as one piece with the body extends at an upward inclination from the front end toward the rear end. A first latch member is operably attached to the body and is adapted for operable engagement with a first cargo cart to releasably lock the portable floor surface to the first cargo cart.

Yet another aspect of the invention includes a method of unloading palleted containers from within a vehicle. The palleted containers are stacked on load supporting floors of cargo carts, wherein the load supporting floors are raised on casters above a floor surface of the vehicle. The cargo carts are disposed in side-by-side releasably locked position adjacent one another to form opposed rows of the cargo carts. The rows are laterally spaced to define an aisle between the opposite rows. The method of unloading the palleted containers includes maneuvering a body along the aisle. The body has a lower surface and an upper surface spaced a predetermined distance from one another and a ramp surface constructed as one piece with the body. The ramp surface extends at an upward inclination from the lower surface to the upper surface. The body has a first latch member operably attached thereto. The method further includes resting the lower surface of the body flat on the floor surface of the vehicle to bring the upper surface of the body into a generally flush relation with the floor of the cargo cart. Further, engaging the latch member of the body to a first cart, and then, wheeling a hand truck down the aisle and up the ramp surface onto the upper surface of the false floor. Next, disposing the palleted containers on the hand truck, and then, wheeling the loaded hand truck down the ramp surface and along the aisle out of the vehicle.

BRIEF DESCRIPTION OF THE DRAWINGS

These and some of the other objects, features and advantages of the invention will become readily apparent in view of the following detailed description of presently preferred embodiments and best mode, appended claims, and accompanying drawings, in which:

DETAILED DESCRIPTION OF PREFERRED EMBODIMENTS

Figure 1:
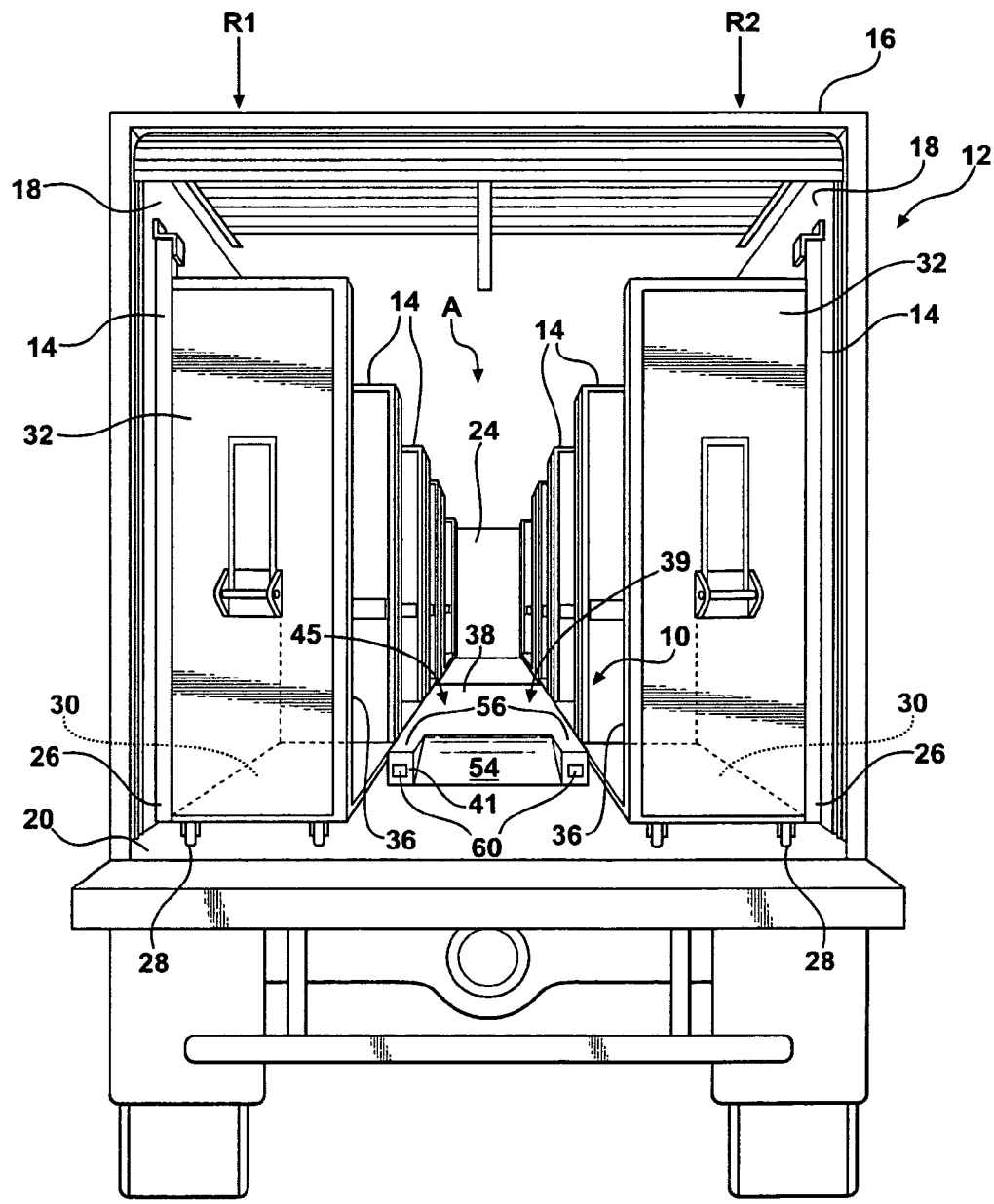
FIG. 1 is a schematic perspective rear view of a delivery vehicle with a portable floor surface according to one embodiment of the invention.
Figure 2:
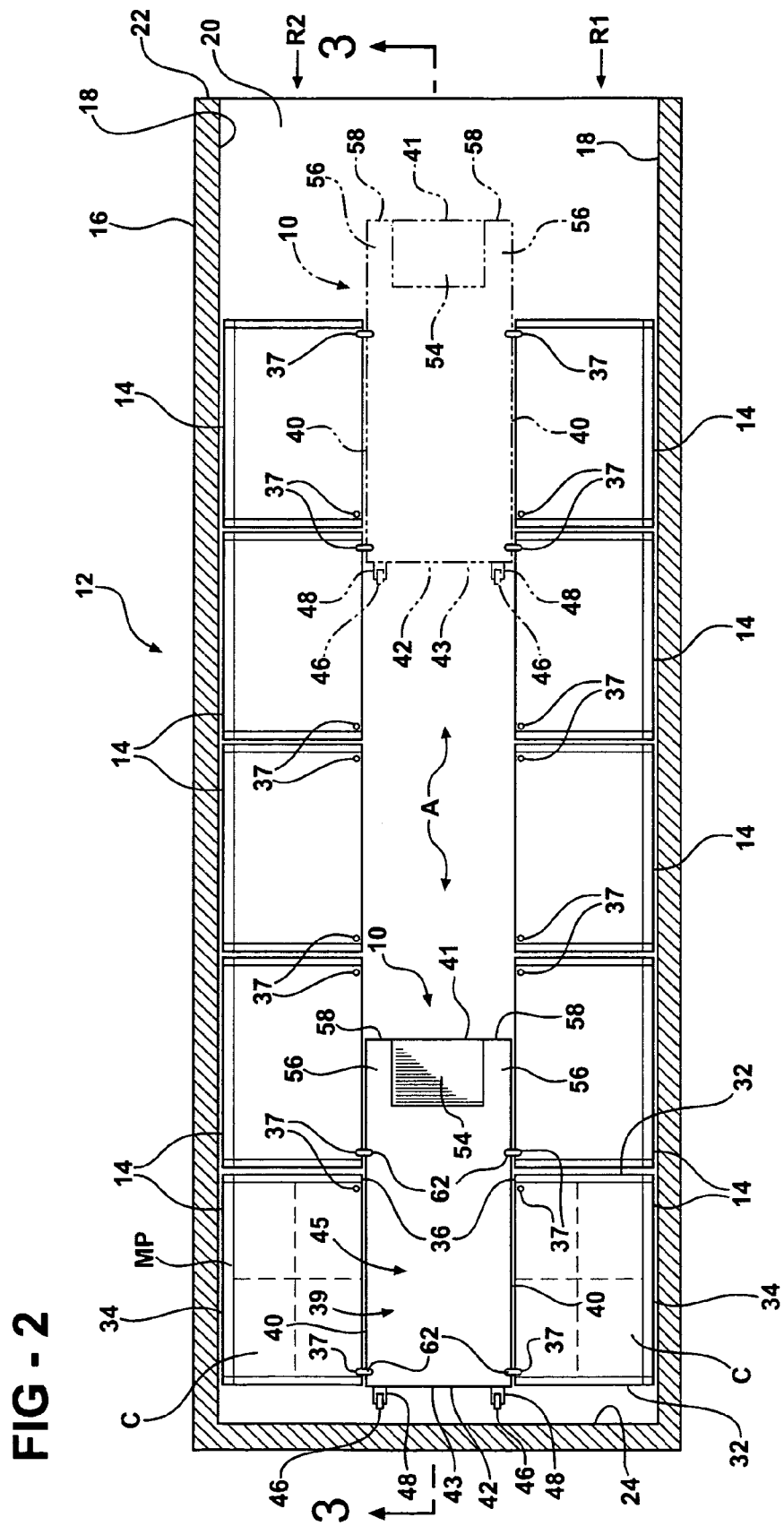
FIG. 2 is a diagrammatic plan view schematically illustrating multiple positions of the floor surface in a central aisle within the vehicle.

Referring in more detail to the drawings, FIGS. 1-5 illustrate a transport cart system constructed according to one presently preferred embodiment having a portable floor surface, referred to hereafter as a false floor 10. The false floor 10 is particularly suited for use with a product support and delivery system such as shown generally at 12 in FIGS. 1-4, and 5A, and disclosed in U.S. Pat. No. 6,410,515 to Krawczyk, incorporated herein by reference in its entirety, and which is assigned to Magline, Inc., the assignee of applicants' invention herein. In one aspect, the system 12 includes a plurality of wheeled modules or carts 14 that can be positioned side-by-side within an interior of a transportation vehicle, such as an enclosed trailer or van 16, for example. The carts 14 are preferably positioned on a floor 20 along opposite sidewalls 18 of the van 16 in longitudinally extending rows $R_1$, $R_2$ (FIGS. 1 and 2). The rows $R_1$, $R_2$ generally extend from a front wall 22 of the van 16 toward a back wall 24 thereof and are laterally spaced from one another to define a center aisle A. The aisle A accommodates the passage of a hand truck used by an operator to facilitate removing containers, such as, by way of example and without limitations, multiple mini-stacks of palleted containers C (FIG. 2), from the carts 14 for transport to a retail sales facility, for example.

As disclosed in the aforementioned incorporated U.S. patent, the carts 14 are generally identical, each including a rigid frame structure provided by a rectangular base frame 26 mounting a set of four caster wheels 28, at least one of which is preferably lockable to preclude normal movement of the cart 14 when locked. A floor or product support member 30 on the cart 14 is carried by the base frame 26 to provide a surface above the van floor 20 on which the stacked containers C are supported.

Figure 4:
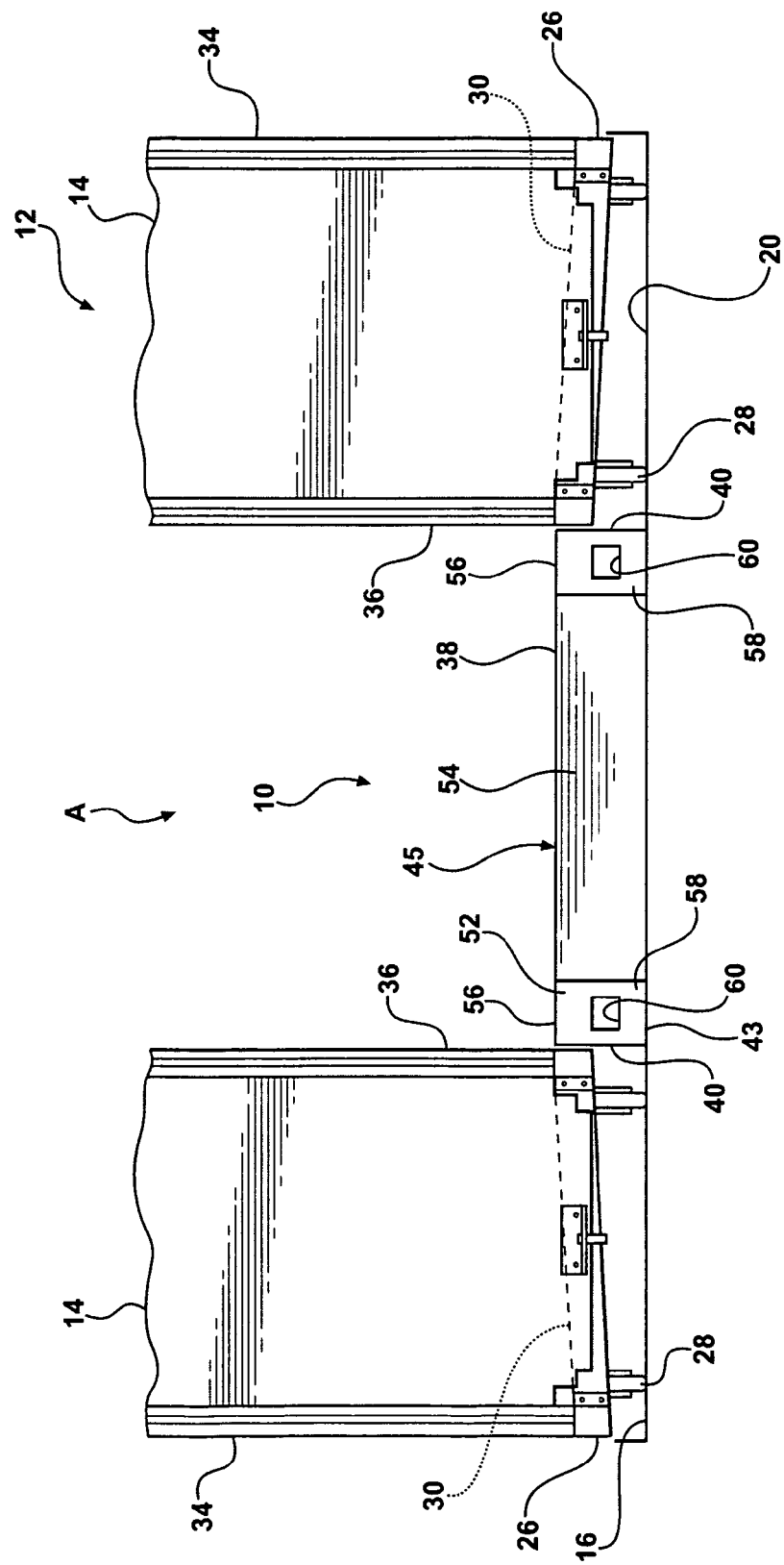
FIG. 4 is a view taken generally along line 4-4 of FIG. 3.

Each cart 14 is generally closed on three of its sides via a pair of upstanding side panels 32 and an upstanding back panel 34. A front side 36 of each cart 14 is generally open to permit loading and unloading of the stacked containers from the cart 14. As shown in FIG. 4, the floor 30 of the cart 14 is preferably angled so as to tilt downwardly from the front 36 toward the back 34 of the cart 14 at an angle of about 3 to 5 degrees, by way of example and without limitations. The slight angle of the floor 30 serves to tilt the stacks of containers C into the carts 14 away from the aisle A to facilitate stabilizing the load during transport. The floors or bottom supports 30 of the carts 14 are preferably fabricated having at least one, and illustrated in FIGS. 2 and 5B, as a pair of openings 37 to facilitate releasable locking engagement of the false floor 10 with one or more carts 14. The interior space of each cart 14 accommodates multiple, and represented here, for example, as four, mini-stacks of the containers C, each supported on an associated mini-pallet MP.

When loading the palleted containers C into the interior space of the carts 14 at a manufacturing or distribution center, for example, one or more mini-stacks of the containers C are preferably loaded according to the brand and quantity called for by the particular retail orders to be delivered on a delivery route. As illustrated in FIG. 2, the carts 14, by way of example and without limitation, are designed to hold four such mini-stacks of containers C, two deep and two wide, within the bay of each cart 14. In this way, each order is pre-assembled on the mini-pallets MP and loaded onto the carts 14 in preparation for delivery. The location of each order is preferably recorded such that an order might be contained in cart no. 4, mini-pallet no. 2, for example. The carts 14 are preferably equipped with a clip board, for example, for holding written or otherwise documented records.

Once loaded, the carts 14 are wheeled into the trailer 16 and positioned side-by-side along the sidewalls 18, thus, forming the two long rows $R_1$, $R_2$ of carts, as illustrated best in FIG. 2. The carts 14 are oriented such that their open fronts 36 face the aisle A. The carts 14 can be locked in position in the manner indicated in the aforementioned incorporated patent. The front-to-back depth of the carts 14 is dimensioned to leave space between the cart rows $R_1$, $R_2$ to define the center walkway or aisle A extending the length of the trailer 16. Aisle A is of sufficient width to accommodate the operator and hand truck. In the present example, the carts 14 have a depth of about 29 inches, providing the aisle A formed within a conventional van or enclosed trailer with a width of about 40 inches between the rows $R_1$, $R_2$.

Figure 3:
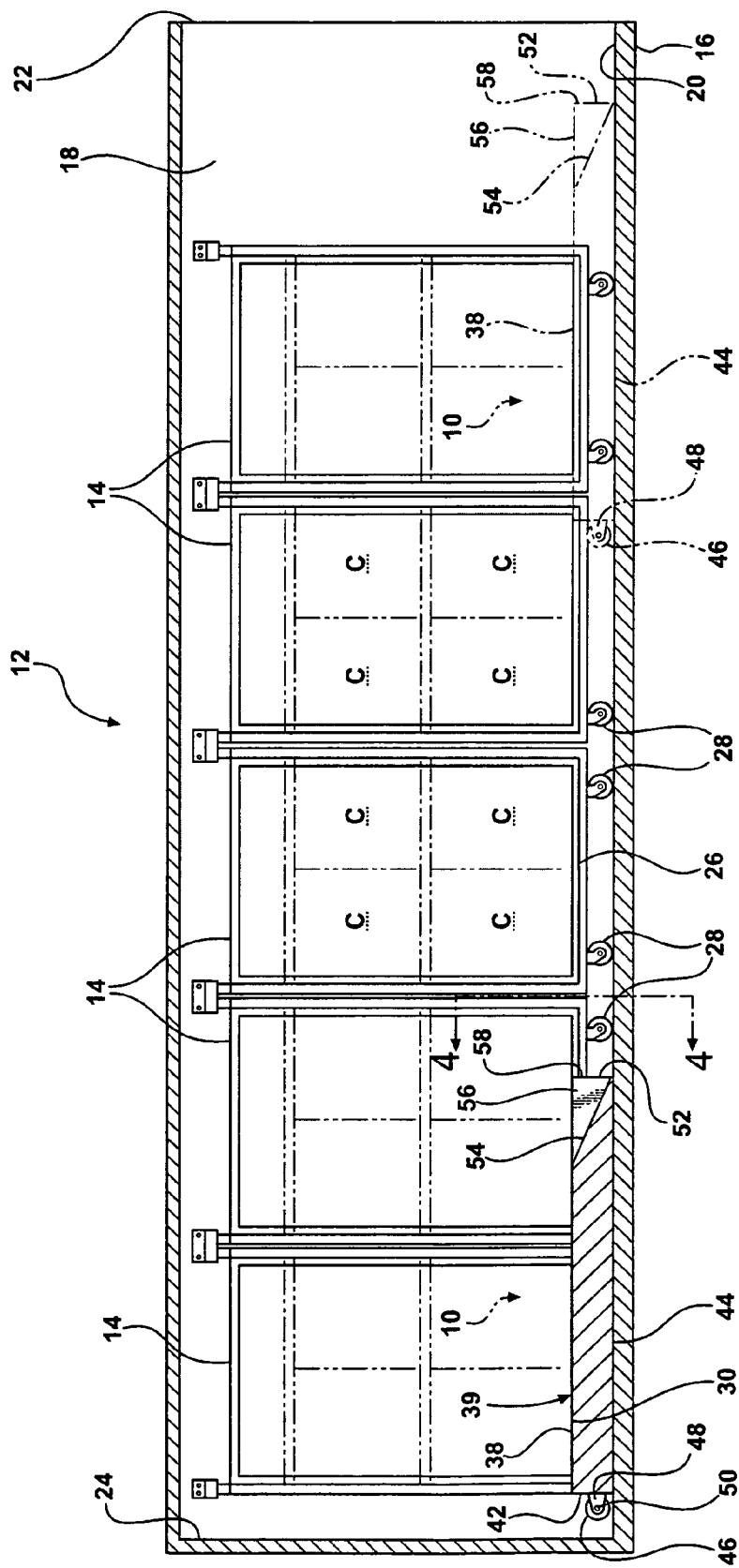
FIG. 3 is a view taken generally along line 3-3 of FIG. 2.

Referring now to FIGS. 3 and 4, it will be seen that the floors 30 of the wheel supported carts 14 are elevated above the level of the floor 20 of the trailer 16 on which the carts 14 are supported. The leading front edge of each cart floor 30 facing the aisle A may be, by way of example and without limitations, about 7½ inches above the floor 20 of the trailer 16. According to the invention, it is desirable to be able to unload the mini-stacks of the containers C from the carts 14 directly with the hand truck, by way of example, disclosed in the aforementioned incorporated patent. The hand truck travels at generally the level of the cart floors 30 on the portable false floor 10 to facilitate engaging, lifting and transporting the mini-stacks C directly with the hand truck. As such, the operator does not need to unload individual ones of the containers C from the carts 14, and manually restack them on the hand truck.

According to the invention, the portable false floor 10 is operable for repositioning in the aisle A between the rows $R_1$, $R_2$ to provide an upper surface 38 that is substantially level, and nearly abutting the leading front edges of the cart floors 30. While various methods of constructing a raised floor, such as by laying down overturned pallets are possible, it can be cumbersome to position the pallets in the desired locations, let alone obtaining a substantially flush floor surface having a smooth ramp transition. The false floor 10 is constructed as a rigid, strong support member, suitable for supporting heavy loads without becoming unstable or moving from its temporarily locked location, until manually repositioning the false floor 10 is desired. Preferably, the false floor 10 is constructed from fabricated aluminum, such as through stamping or cutting a predetermined size sheet, and thereafter bending and/or welding seams to form a one piece body 39. It should be understood that other materials, such as steel, or high strength polymeric materials, for example, could be used in combination with molding or other operations, as required to achieve the desired false floor body shape. A layer of non-skid material, such as rubber or a rubberized material, for example, may be adhered to at least a portion of the upper surface 38 of the body 39 to provide a non-skid, high traction surface 45.

As shown in FIG. 2, the false floor 10 preferably has two generally parallel upstanding sidewalls 40 that extend generally between front and rear ends 41, 43, with an upstanding rear wall 42 extending between the sidewalls 40. As best shown in FIG. 4, the sidewalls 40 are spaced a predetermined distance from one another to fit relatively closely and narrowly within the aisle A defined between the secured carts 14. Accordingly, in this example, the sidewalls 40 may be constructed having outer surfaces spaced about 39 inches from one another, thereby leaving about one-half inch gaps between the opposite sidewalls 40 of the false floor 10 and the leading front edges of the carts 14. It should be understood that the sidewalls 40 may be constructed having any suitable width to accommodate aisles of differing widths.

As shown in FIG. 3, the rear wall 42 and the sidewalls 40 extend downwardly from the upper surface 38 an equal distance to form a flat base or lower surface 44. To facilitate removing the mini-pallets MP from the carts 14, the lower surface 30 and the upper surface 38 are spaced a predetermined distance from one another by the sidewalls 40 and rear wall 42. Accordingly, to facilitate removal of the mini-pallets MP and/or containers C from the carts 14, in this example, the sidewalls 40 and rear wall 42 are about 7½ inches tall. As such, the upper surface 38 of the false floor 10 is gradually brought into a substantially flush relation with the leading front edges of the floors 30 of opposite carts 14 across the aisle A.

As shown in FIGS. 2 and 3, to facilitate moving the portable false floor 10, preferably, at least one, and shown here, by way of example and without limitation, as a pair of wheels or rollers 46 are operably attached to the rear wall 42. The rollers 46 are laterally spaced from one another inwardly from the sides 40 a suitable distance to avoid interfering with the carts 14, while providing stability to the false floor 10 while it is being moved from one location to another. The rollers 46 are represented as being journaled separately from one another on laterally spaced support brackets 48 via separate axles 50, though, the rollers 46 could be supported by a single axle extending laterally between the support brackets 48, if desired. The support brackets 48 are attached to the rear end 43 by using any suitable fastener, such as screws or bolts, for example. Though represented as being generally fixed, the rollers 46 could be provided for retractable movement into a recess (not shown) in the rear wall 42, thereby allowing the rear wall 42 to be moved into generally flush contact with another flat surface.

To prevent unintentional or unwanted movement of the false floor 10, the rollers 46 are preferably attached to provide a clearance between the rollers 46 and the trailer floor 20 when the lower surface 44 of the false floor 10 is lying flat on the trailer floor 20. Accordingly, axes about which the wheels rotate, defined here by the axles 50, are preferably spaced from the floor 20 a distance greater than the outer diameter of the rollers 46. Stated another way, the rollers 46 are preferably spaced upwardly from a plane P defined by the lower surface 44, such that the rollers 46 do not intersect or penetrate the plane P. As such, the rollers 46 do not interfere with the ability of the false floor 10 to rest flat on the trailer floor 20, and thus, remain spaced from the trailer floor 20 as to avoid promoting movement of the false floor 10 while it is resting on the trailer floor 20.

The false floor 10 has a ramp surface 54 extending generally from the front end 41 toward the back wall 42. The ramp surface 54 is constructed having a generally gradual inclination from the lower surface 44 generally adjacent the front end 41 up to the upper surface 38 to allow the hand truck to be easily maneuvered up and down the ramp surface 54. The ramp surface 54 is constructed integrally and preferably as one piece with the false floor 10. The ramp surface 54, by way of example and without limitations, is shown as being formed in generally centered relation between the sidewalls 40 and having a width less than the width between the sidewalls 40. Preferably, the inclination of the ramp surface 54 provides the generally horizontal upper surface 38 with enough length to span an entire width of at least one cart 14. As such, the ramp surface 54 does not inhibit the user's ability to unload a selected cart or carts 14.

With the ramp surface 54 spanning less than the entire width of the false floor 10, a pair of ledges 56 having the same height as the upper surface 38 is formed on opposite sides of the ramp surface 54. The ledges 56 have front surfaces 58, preferably constructed having a gripping mechanism, represented here, by way of example and without limitations, as recessed hand slots, referred to hereafter as grips 60 constructed therein. The grips 60 facilitate a user's ability to easily grasp and lift the front end 41 of the false floor 10 until the rollers 46 adjacent the rear end 43 engage the floor 20 of the trailer 16. Thereafter, the false floor 10 is easily rolled along the floor 20 to the selected location. The grips 60 may be constructed otherwise than as shown here, and could be replaced with handles (not shown) attached to the front surfaces 58, if desired. It is to be understood that the ramp surface 54 could be constructed spanning the entire width between the sidewalls 40, and that the hand slots or handles could be formed in, or attached to an outer surface of the ramp surface 54, preferably adjacent from the sidewalls 40 and inwardly therefrom.

Figure 5:
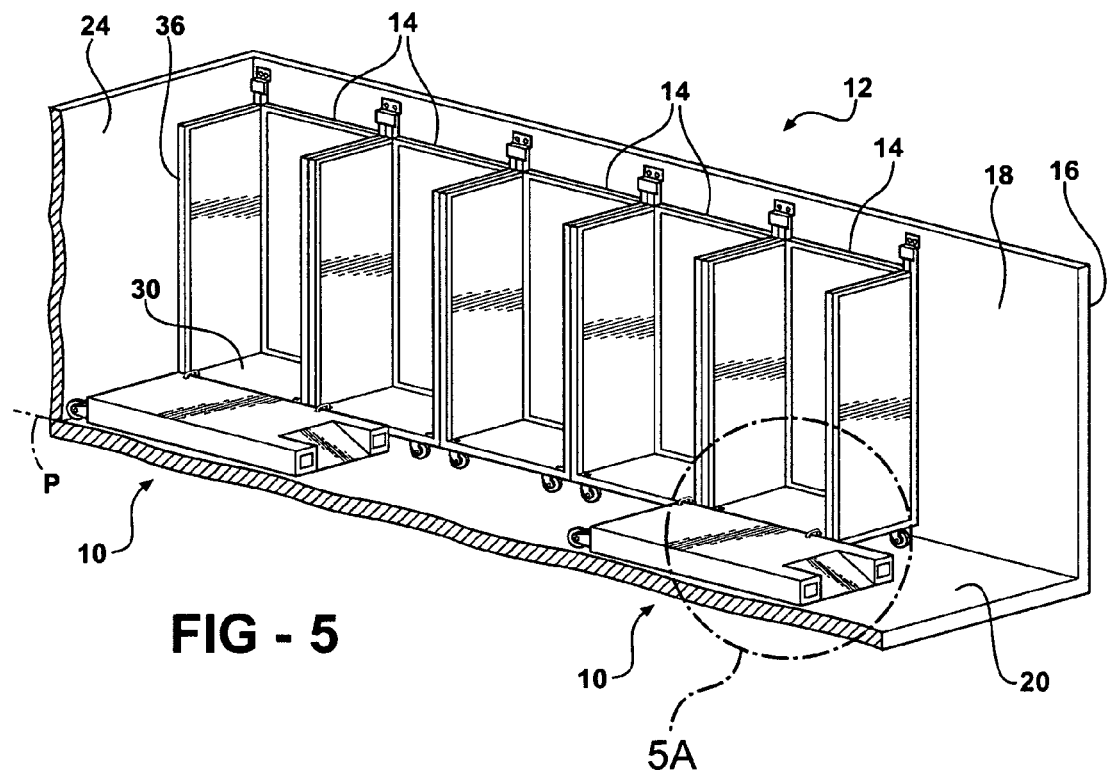
FIG. 5 is a schematic perspective cutaway view of the vehicle of FIG. 2.
Figure 5A:
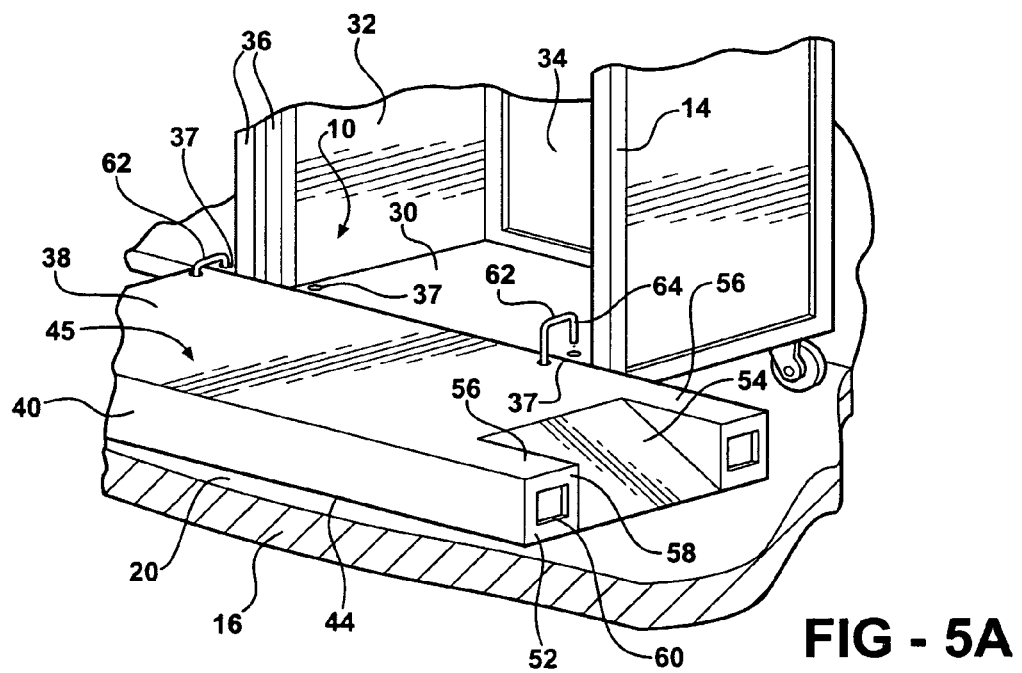
FIG. 5A is an enlarged view of the encircled area 5A of FIG. 5.

As best shown in FIGS. 5A and 5B, the false floor 10 normally spans two or more adjacent carts 14 when in a selected, releasably locked position. To facilitate securing the false floor 10 in a selected position, a locking mechanism, represented here, by way of example and without limitations, as a plurality of latch members 62, is arranged adjacent at least one, and represented here, for example, as both the side wall 40 edges of the false floor 10 for releasable, locking receipt within the openings 37 in the floors 20 of the carts 14. The latch members 62 are shown here, by way of example and without limitations, as being generally L or U-shaped hooks that are operably associated with the body and preferably extendable upwardly and laterally from the upper surface 38, though they could be fixed to the body. The latch members 62 have a depending portion 64 adapted for releasable close receipt within the openings 37 in the floors 20 of the carts 14. Preferably, the latching members 62 are attached to the false floor 10 in laterally spaced relation from one another for receipt within openings 37 in a pair of first and second adjacent carts 14 positioned in the same row, though they could be received within openings 37 in a single cart 14. By releasably securing the false floor 10 to adjacent carts 14 which are preferably releasably locked in position along one of the rows $R_1$, $R_2$ in the van 16, the false floor 10 is maintained in a rigid, secure position, until the user desires to move the false floor 10. It should be recognized that the latch members 62 can be constructed for plunging, biased, and/or pivotal movement relative to the upper surface 38 to enable the latch members 62 to move between extended and retracted positions, and/or between inwardly and outwardly pivoted positions relative to the sidewalls 40 to facilitate releasably locking the false floor 10 to one or more carts 14, and to facilitate movement of the false floor 10 along the aisle A.

Upon arrival at delivery location, the operator simply maneuvers the relatively lightweight false floor 10 down the aisle A by grasping the grips 60 and rolling the false floor 10 on the rollers 46 with the ramp surface 54 facing a tail gate of the trailer 16. Upon reaching the desired cart or carts 14, the false floor 10 is positioned flat on the floor 20 of the trailer 16 in front of the cart or carts 14 selected for container C removal. Upon lowering the false floor 10, the latch members 62 can be engaged and releasably locked in the openings 37 in a single cart or an adjacent pair of carts 14. Thus, the false floor 10 is secured and prevented from moving out of its temporarily location. The hand truck is then wheeled down the aisle A, up the ramp surface 54 and onto the upper surface 38 of the false floor 10. With the hand truck being at substantially the same level as the floor 30 of the selected cart or carts 14, the selected product or mini-stacks of containers C can then removed from the desired carts 14 via the hand truck, or easily placed on the hand truck. The hand truck is then rolled off the false floor 10 via the ramp surface 54, and down the aisle A and out of the tail gate of the van 16 to an unloading ramp, or the like. The false floor 10 is then lifted via the hand slots 60, thereby removing the latch members 62 from their temporary locked engagement with the carts 14, thus, enabling the false floor 10 to be rolled via the rollers 46 to the next selected location for continued use, or to a storage location, preferably clear from the aisle.

While certain preferred embodiments have been shown and described, persons of ordinary skill in this art will readily recognize that the preceding description has been set forth in terms of description rather than limitation, and that various modifications and substitutions can be made without departing from the spirit and scope of the invention. The invention is defined by the following claims.

We claim:

1. A portable floor surface for use to facilitate unloading side-by-side cargo carts disposed in laterally spaced relation to leave an aisle between them, the cargo carts having a floor raised on casters, the portable floor surface comprising:
    a body having opposite front and rear ends with a lower surface and an upper surface extending between said front and rear ends, said lower surface and upper surface being spaced a predetermined distance from one another to bring said upper surface into a generally flush relation with the floor of the cargo cart when said lower surface is resting on a common floor surface with the cargo cart;
    a ramp surface extending at an upward inclination from said front end toward said rear end of said body, said ramp surface being constructed as one piece with said body; and
    a latch member operably associated with said body and adapted for operable engagement with a first cargo cart to releasably lock said portable floor surface to the first cargo cart and another latch member operably associated with said body and adapted for operable engagement with a second cargo cart adjacent the first cargo cart and in the same row as the first cargo cart to releasably lock said portable floor surface to the second cargo cart.

2. The portable floor surface of claim 1 further including at least one roller operably attached to said rear end, said roller engaging the common floor surface when the false floor is inclined relative to the common floor surface to facilitate transporting said portable floor surface.

3. The portable floor surface of claim 2 wherein said lower surface defines a plane and said at least one roller is spaced upwardly from the plane.

4. The portable floor surface of claim 2 wherein said at least one roller is spaced from the common floor surface when said lower surface is resting flat on the common floor surface.

5. The portable floor surface of claim 2 further including a hand grip adjacent said front end to facilitate lifting and transporting said portable false floor on said at least on roller.

6. The portable floor surface of claim 5 further including a pair of hand grips on opposite sides of said ramp surface.

7. A portable floor surface in combination with cargo carts transportable in an interior of a vehicle, the cargo carts having a load supporting floor raised on casters above a floor surface of the vehicle for supporting palleted containers, the cargo carts being disposed in side-by-side releasably locked position adjacent one another to form opposed rows of the cargo carts laterally spaced to define an aisle between the opposite rows, the portable floor surface comprising:
    a body having opposite front and rear ends with a lower surface and an upper surface extending between said front and rear ends, said lower surface and upper surface being spaced a predetermined distance from one another to bring said upper surface into a generally flush relation with the floor of the cargo cart when said lower surface is resting on the floor surface of the vehicle;
    a ramp surface extending at an upward inclination from said front end toward said rear end, said ramp surface being constructed as one piece with said body; and
    a first latch member operably attached to said body and adapted for operable engagement with a first one of said at least one of said cargo carts to releasably lock said portable floor surface to the first cargo cart and another latch member operably attached to said body and adapted for operable engagement with a second cargo cart adjacent said first cargo cart and in the same row as said first cargo cart to releasably lock said portable floor surface to said first and second cargo carts.

8. The portable floor surface of claim 7 further including at least one roller operably attached to said rear end, said roller engaging said floor surface of the vehicle when said lower surface of the false floor is lifted from said floor surface to facilitate maneuvering said portable floor surface on said at least one roller.

9. The portable floor surface of claim 8 wherein said lower surface defines a plane and said at least one roller is spaced upwardly from said plane.

10. The portable floor surface of claim 8 wherein said at least one roller is spaced from said floor surface when said lower surface of said false floor is resting flat on the said floor surface.

11. The portable floor surface of claim 7 further including a hand grip adjacent said front end to facilitate lifting and transporting said portable false floor.

12. The portable floor surface of claim 11 further including a pair of hand grips on opposite sides of said ramp surface.

13. A device for use to facilitate unloading cargo carts having a floor raised on casters, the device comprising:
    a body having opposite front and rear ends with a lower surface and a planar upper surface extending at least a portion of the distance between said front and rear ends, said lower surface and upper surface being spaced a predetermined distance from one another to bring said upper surface into a generally flush relation with an adjacent portion of the floor of the cargo cart when said lower surface is resting on a common floor surface with the cargo cart;
    a ramp surface extending at an upward inclination from the common floor at said front end and rising to said upper surface between said front and rear ends of said body, said ramp surface being constructed as one piece with said body;
    a latch member operably associated with said body and adapted for operable engagement with a first cargo cart to releasably lock said portable floor surface to the first cargo cart; and
    at least one roller attached adjacent to an end of the body, said roller engaging the common floor surface to facilitate transporting said portable floor surface relative to at least one cargo cart.

14. The device of claim 13 which also comprises another latch member operably associated with said body and adapted for operable engagement with a second cargo cart adjacent the first cargo cart and in the same row as the first cargo cart to releasably lock said portable floor surface to the second cargo cart.

* * * * *